United States Patent [19]

Beaman et al.

[11] Patent Number: 4,938,816

[45] Date of Patent: Jul. 3, 1990

[54] SELECTIVE LASER SINTERING WITH ASSISTED POWDER HANDLING

[75] Inventors: Joseph J. Beaman; Carl R. Deckard, both of Austin, Tex.

[73] Assignee: Board of Regents, The University of Texas System, Austin, Tex.

[21] Appl. No.: 402,693

[22] Filed: Sep. 5, 1989

Related U.S. Application Data

[63] Continuation-in-part of Ser. No. 920,580, Oct. 17, 1986, Pat. No. 4,863,538.

[51] Int. Cl.$^5$ .................... B27N 3/00; B32B 31/00; B23K 9/00; B29C 67/00
[52] U.S. Cl. ........................ 156/62.2; 156/272.4; 156/272.8; 219/121.66; 219/121.8; 219/121.85; 264/22; 264/58; 264/113; 264/125; 425/174
[58] Field of Search .............. 156/62.2, 89, 242, 245, 156/272.4, 272.8, 278, 345, 500, 501; 219/121.6, 121.61, 121.63, 121.64, 121.65, 121.66, 121.73, 121.8, 121.85; 264/22, 24, 26, 58, 113, 125, 126, 127; 425/174, 174.4, 174.8 E; 419/5, 8, 38

[56] References Cited

U.S. PATENT DOCUMENTS

| | | | |
|---|---|---|---|
| 2,076,952 | 4/1937 | Kratky | 75/137 |
| 3,848,104 | 11/1974 | Locke | 219/121 L |
| 3,985,995 | 10/1976 | Brandi et al. | 219/76 |
| 4,117,302 | 9/1978 | Earle et al. | 219/121 LM |
| 4,135,902 | 1/1979 | Oehrle | 65/2 |
| 4,270,675 | 6/1981 | Wicks et al. | 222/196 |
| 4,300,474 | 11/1981 | Livsey | 118/641 |
| 4,323,756 | 4/1982 | Brown et al. | 219/121 LF |
| 4,474,861 | 10/1984 | Ecer | 428/614 |
| 4,540,867 | 9/1985 | Ackerman | 219/121 LW |
| 4,575,330 | 3/1986 | Hull | 425/174.4 |
| 4,752,352 | 6/1988 | Feygin | 156/630 |
| 4,818,562 | 4/1989 | Arcella et al. | 427/53.1 |
| 4,863,538 | 9/1989 | Deckard | 156/62.2 |

FOREIGN PATENT DOCUMENTS

| | | |
|---|---|---|
| 0209366 | 7/1986 | European Pat. Off. . |
| 2263777 | 7/1973 | Fed. Rep. of Germany . |
| 137951 | 10/1979 | Fed. Rep. of Germany . |
| 2166526 | 7/1973 | France . |
| 57-156959 | 7/1984 | Japan . |
| 57-185536 | 8/1984 | Japan . |
| 1215184 | 7/1968 | United Kingdom . |

OTHER PUBLICATIONS

Chicago Enterprise, vol. I, No. II (May 1987).
Crain's Chicgo Business (1987).
Machine and Tool Blue Book "Laser-Cut Laminations Form Complex Parts" (4/87).
Laser Focus/Electro-Optics, p. 41 (Jun. 1987).
Inside R&D The Weekly Report on Technical Innovation, vol. 16, No. 19 (5/13/87).
Immediate Production of 3-D Objects, Hydronetics, Inc.
Lasers Carve Complex 3-D Parts (pp. 1-11).
Sample Cover Letter From Hydronetics, Inc.
Electrical Engineering Times, Issue 430 (Apr. 20, 1987).
Takei, et al. (May 1980), J. Appl. Phys., 51:2903-2908.
Fudim, "Sculpting Parts With Light", Machine Design, Mar. 6, 1986.

*Primary Examiner*—William A. Powell
*Attorney, Agent, or Firm*—Vinson & Elkins

[57] ABSTRACT

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed. Preferably, the powder is deposited to the target area of the laser and attains high bulk density during sintering.

30 Claims, 7 Drawing Sheets

FAST GALVO
POSITION FEEDBACK

D/A #1 OUTPUT

MSB OF DATA WORD

LASER MODULATION
SIGNAL

FLAG

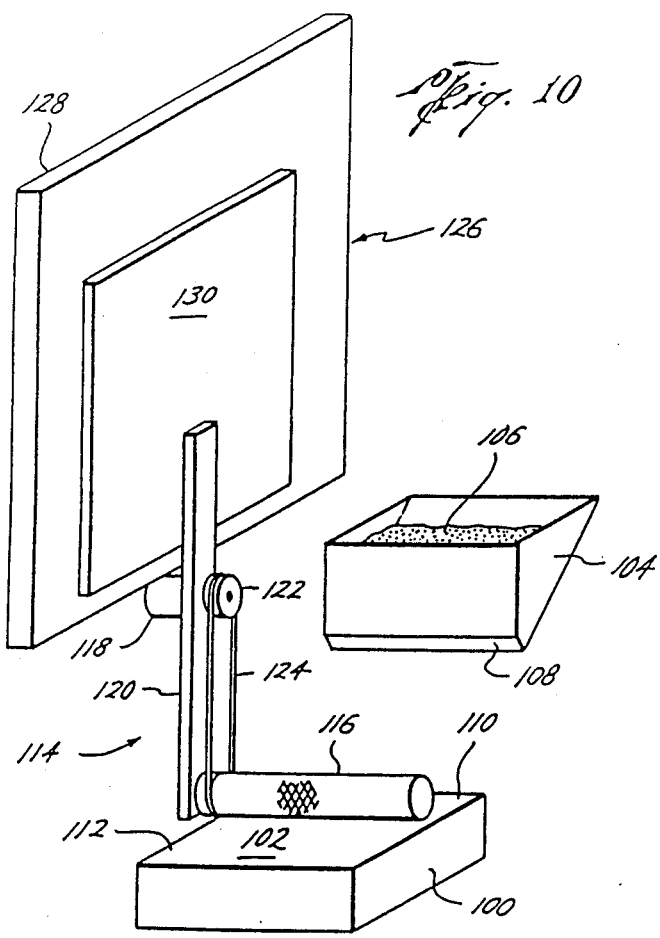

SELECTIVE LASER SINTERING WITH ASSISTED POWDER HANDLING

BACKGROUND OF THE INVENTION

The present application is a continuation-in-part of Ser. No. 06/920,580, filed Oct. 17, 1986, now U.S. Pat. No. 4,863,538.

1. FIELD OF THE INVENTION

This invention relates to a method and apparatus which uses a directed energy beam to selectively sinter a powder to produce a part. In particular, this invention relates to a computer aided laser apparatus which sequentially sinters a plurality of powder layers to build the desired part in a layer-by-layer fashion. The present application is particularly directed toward a device and method for dispensing a layer of powder to attain a high bulk density of the powder in each layer during sintering.

2. DESCRIPTION OF THE RELEVANT ART

The economies associated with conventional part production methods are generally related directly to the quantity of parts to be produced and the desired material characteristics of the finished parts. For example, large scale manufacture casting and extrusion techniques are often cost effective, but these production methods are generally unacceptable for small quantities—i.e. replacement parts or prototype production. Many such conventional part production methods require expensive part specific tooling. Even powder metallurgy requires a die for shaping the powder, making powder metallurgy unattractive as a method for producing a small number of parts.

Where only a small number of parts are desired, conventional production methods involving a subtractive machining method are usually used to produce the desired part. In such substractive methods, material is cut away from a starting block of material to produce a more complex shape. Examples of substractive machine tool methods include: milling, drilling, grinding, lathe cutting, flame cutting, electric discharge machine, etc. While such conventional machine tool substractive methods are usually effective in producing the desired part, they are deficient in many respects.

First, such conventional machine tool substractive methods produce a large amount of waste material for disposal. Further, such machine tool methods usually involve a large initial expense for setting up the proper machining protocol and tools. As such, the set-up time is not only expensive, but relies a great deal on human judgment and expertise. These problems are, of course, exacerbated when only a small number of parts are to be produced.

Another difficulty associated with such conventional machining techniques involves tool wear—which not only involves the cost of replacement, but also reduces machining accuracy as the tool wears. Another limit on the accuracy and tolerance of any part produced by conventional machining techniques is the tolerance limits inherent in the particular machine tool. For example, in a conventional milling machine or lathe, the lead screws and ways are manufactured to a certain tolerance, which limits the tolerances obtainable in manufacturing a part on the machine tool. Of course, the tolerances attainable are reduced with age of the machine tool.

The final difficulty associated with such conventional machine tool subtractive processes is the difficulty or impossibility of making many part configurations. That is, conventional machining methods are usually best suited for producing symmetrical parts and parts where only the exterior part is machined. However, where a desired part is unusual in shape or has internal features, the machining becomes more difficult and quite often, the part must be divided into segments for production. In many cases, a particular part configuration is not possible because of the limitations imposed upon the tool placement on the part. Thus, the size and configuration of the cutting tool do not permit access of the tool to produce the desired configuration.

There are other machining processes which are additive, for example, plating, cladding, and some welding processes are additive in that material is added to a starting substrate. In recent years, other additive-type machining methods have been developed which use a laser beam to coat or deposit material on a starting article. Examples include U.S. Pat. Nos. 4,117,302; 4,474,861; 4,300,474; and 4,323,756. These recent uses of lasers have been primarily limited to adding a coating to a previously machined article. Often such laser coating methods have been employed to achieve certain metallurgic properties obtainable only by such coating methods. Typically, in such laser coating methods the starting article is rotated and the laser directed at a fixed location with the coating material sprayed onto the article so that the laser will melt the coating onto the article.

Additionally a process for compressing a powder based material into a coherent mass prior to sintering has been suggested. An example includes U.S. Pat. No. 4,752,352.

SUMMARY OF THE INVENTION

The problems outlined above are in large major solved by the method and apparatus of the present invention. The present invention includes a directed energy beam—such as a laser—and is adaptable to produce almost any three dimensional part. The method of the present invention is an additive process, with the powder being dispensed into a target area where the laser selectively sinters the powder to produce a sintered layer. The invention is a layer-wise process in which the layers are joined together until the completed part is formed. The method of the present invention is not limited to a particular type of powder, but rather is adaptable to materials including but not limited to plastic, metal, polymer, ceramic powders, or composite materials.

Broadly speaking, the apparatus includes a laser or other directed energy source which is selectable for emitting a beam in a target area where the part is produced. A powder dispenser system deposits powder into the target area. A laser control mechanism operates to move the aim of the laser beam and modulates the laser to selectively sinter a layer of powder dispensed into the target area. The control mechanism operates to selectively sinter only the powder disposed within defined boundaries to produce the desired layer of the part. The control mechanism operates the laser to selectively sinter sequential layers of powder, producing a completed part comprising a plurality of layers sintered together. The defined boundaries of each layer correspond to respective cross-sectional regions of the part. Preferably, the control mechanism includes a computer—e.g. a CAD/CAM system to determine the defined boundaries for each layer. That is, given the overall dimensions and configuration of the part, the computer determines the defined boundaries for each layer and operates the laser control mechanism in accordance with the defined boundaries. Alternatively, the computer can be initially programmed with the defined boundaries of each layer.

In a preferred form, the laser control mechanism includes a mechanism for directing the laser beam in the target area and a mechanism for modulating the laser beam on and off to selectively sinter the powder in the target area. In one embodiment, the directing mechanism operates to move the aim of the laser beam in a continuous raster scan of target area. The modulating mechanism turns the laser beam on and off so that the powder is sintered only when the aim of the laser beam is within the defined boundaries for the particular layer. Alternatively, the directing mechanism aims the laser beam only within the defined boundaries for the particular layer so that the laser beam can be left on continuously to sinter the powder within the defined boundaries for the particular layer.

In a preferred embodiment, the directing mechanism moves the laser beam in a repetitive raster scan of the target area using a pair of mirrors driven by galvonometers. The first mirror reflects the laser beam to the second mirror which reflects the beam into the target area. Shifting movement of the first mirror by its galvonometer shifts the laser beam generally in one direction in the target area. Similarly, shifting movement of the second mirror by its galvonometer shifts the laser beam in the target area in a second direction. Preferably, the mirrors are oriented relative to each other so that the first and second directions are generally perpendicular to each other. Such an arrangement allows for many different types of scanning patterns of the laser beam in the target area, including the raster scan pattern of the preferred embodiment of the present invention.

The method of part production of the present invention includes the steps of depositing a first portion of powder onto a target surface, scanning the aim of a directed energy beam (preferably a laser) over the target surface, and sintering a first layer of the first powder portion on the target surface. The first layer corresponds to a first cross-sectional region of the part. The powder is sintered by operating the directed energy source when the aim of the beam is within the boundaries defining the first layers. A second portion of powder is deposited onto the first sintered layer and the aim of the laser beam scanned over the first sintered layer. A second layer of the second powdered portion is sintered by operating the directed energy source when the aim of the beam is within the boundaries defining the second layer. Sintering of the second layer also joins the first and second layers into a cohesive mass. Successive portions of powder are deposited onto the previously sintered layers, each layer being sintered in turn. In one embodiment, the powder is deposited continuously into the target.

In a preferred embodiment, the laser beam is modulated on and off during the raster scan so that the powder is sintered when the aim of the beam is directed within the boundaries of the particular layer. Preferably, the laser is controlled by a computer; the computer may include a CAD/CAM system, where the computer is given the overall dimensions and configuration of the part to be made and the computer determines the boundaries of each cross-sectional region of the part. Using the determined boundaries, the computer controls the sintering of each layer corresponding to the cross-sectional regions of the part. In an alternative embodiment, the computer is simply programmed with the boundaries of each cross-sectional region of the part.

Additionally, another embodiment of the present invention includes an apparatus for producing a part comprising a beam device for selectively emitting a directed energy beam, structure for providing a target area for producing the part, a device for depositing a powder into the target area, and a control device for moving the aim of the beam and for modulating the beam to selectively sinter, within defined boundaries, a layer of powder deposited in the target area. The control device is operable to effect selective sintering of sequential layers of powder within respective defined boundaries to produce a part comprising a plurality of layers sintered together. Preferably, the powder attains a high bulk density during sintering.

In an additional embodiment, the powder depositing device comprises apparatus to electrostatically charge and dispense the powder. Preferably, an electromagnetic field is produced proximate the target area wherein the field induces high bulk density in the powder in the target area during sintering.

As used throughout this document, electromagnetic field includes but is not limited to electrostatic and magnetostatic fields.

In still another embodiment of the present invention, the powder depositing device comprises apparatus to dispense a polarizable powder. Preferably, an electromagnetic field is produced proximate the target area where the field induces high bulk density by polarization forces in the powder in the target area during sintering.

In another embodiment of the present invention, the depositing device comprises apparatus to dispense the powder, with the powder having a first electrical charge and the target area having a second electrical charge. The first electrical charge is of opposite charge to the second electrical charge and the first charge may be of a different magnitude than the second charge.

In a further embodiment of the present invention, the depositing device comprises apparatus to dispense a first portion of the powder with a first electrical charge on the first portion of the powder. A contouring device is passable proximal the first portion of powder in the target area to remove the first charge. Preferably, the depositing device further comprises apparatus to dispense a second portion of the powder with a second electrical charge on the second portion. The second electrical charge being of opposite charge to the first electrical charge and the first charge may be of a different magnitude than the second charge.

In yet another embodiment of the present invention, the depositing device comprises an apparatus for directing a fluid stream to the powder deposited in the target area to increase the bulk density of the deposited powder during sintering.

In another embodiment of the present invention, the depositing device comprises an apparatus to enable the application of centrifugal force to the deposited powder to induce high bulk density in the powder.

The electromagnetic fields produced in the embodiments of the present invention may have varying field strengths across the target area.

In yet another embodiment of the present invention, the apparatus for depositing the powder further comprises an electrically charged drum, a device for moving the drum from one end of a region having a mound of powder to another end of the region with a desired spacing between the region and the drum, a device for rotating the drum counter to the direction of movement of the drum from one end of the region to the other, and the drum device being operable when counter-rotated and moved from one end of the region to the other to contact the mound of powder and eject powder in the direction of movement to leave a layer of powder between the drum and the one end of the region. The layer of powder has a thickness of approximately the desired spacing.

In still another embodiment of the present invention, the powder is magnetic and the device for depositing the powder preferably comprises a device for producing an electromagnetic field proximate the target area where the electromagnetic field induces high bulk density in the powder in the target area during sintering.

An embodiment of a method of producing a part according to the present invention comprises the steps of depositing a first portion of powder onto a target surface, scanning the aim of a directed energy beam over the target surface, sintering a first layer of the first powder portion corresponding to a first cross-sectional region of the part by operating the beam when the aim of the beam is within boundaries defined by the first cross-sectional region, depositing a second portion of powder onto the first sintered layer, scanning the aim of a directed energy beam over the first sintered layer, sintering a second layer of a second powder portion corresponding to a second cross-sectional region of the part by operating the beam when the aim of the beam is within boundaries defined by the second cross-sectional region, and, during the sintering of the second layer, joining the first and second layers. Successive layers of powder are deposited onto the previous sintered layers and sintering of each successive portion is performed to produce a part comprising a plurality of sintered layers. Preferably, the steps of depositing the powder each further comprise the substep of inducing and attaining a high bulk density in the first and second portions of powder during sintering.

In another embodiment of the method of the present invention, each depositing step further comprises the substeps of electrostatically charging and dispensing the powder. Preferably, an electromagnetic field is produced proximate the target surface and the electromagnetic field induces high bulk density in the deposited powder during sintering.

In another embodiment of the method of the present invention, a polarizable powder is dispensed. Preferably, an electromagnetic field is produced proximate the target area where the electromagnetic field induces high bulk density by polarization forces in the deposited powder during sintering.

In yet another embodiment of the method of the present invention, each step of depositing further comprises the substeps of dispensing the powder with the powder having a first electrical charge, and placing a second electrical charge on the target surface. The first electrical charge is of opposite charge to the second electrical charge and the first charge may be of a different magnitude than the second charge.

In still another embodiment of the method of the present invention, each step of depositing further comprises the substep of directing a fluid stream to said deposited powder to induce high bulk density in the deposited powder during sintering.

In yet another embodiment of the method of the present invention, each step of depositing further comprises the substep of applying centrifugal force to said deposited powder to induce high bulk density in the deposited powder.

In still another embodiment of the method of the present invention, each step of depositing further comprises the substeps of placing a first electrical charge on a first portion of the powder, dispensing the first portion, and passing a contouring device proximal the dispensed first portion. Further, a second electrical charge is preferably placed on the second portion of the powder and the second portion is dispensed. The first electrical charge is preferably of opposite charge to the second electrical charge and the first charge may be of a different magnitude than the second charge.

In another embodiment of the method of the present invention, the powder is magnetic, e.g., magnetizable or hard ferromagnetic material, and the depositing steps each further comprise the substep of producing an electromagnetic field proximate the target surface where the electromagnetic field induces high bulk density in the deposited powder during sintering.

A further embodiment of the present invention offers a method of applying a layer of powder in a region comprising the steps of depositing a mound of powder proximate one end of the region, moving an electrically charged drum in a direction from one end of the region towards another end of the region, rotating the drum counter to the direction of movement from the one end towards the other end of the region, contacting the mound of powder with the counter-rotating drum as it moves towards the other end, and ejecting powder from the mound in the direction of movement from contact between the drum and mound, a layer of powder being left behind the moving drum between the drum and the one end of the region.

As can be appreciated from the above general description, the method and apparatus of the present invention solves many of the problems associated with known part production methods. First, the present invention is well suited for prototype part production or replacement part production of limited quantities. Further, the method and apparatus hereof are capable of making parts of complex configurations unobtainable by conventional production methods. Further, the present invention eliminates tool wear and machine design as limiting factors on the tolerances obtainable in producing the part. Finally, with the apparatus of the present invention incorporated into a CAD/CAM environment, a large number of replacement parts can be programmed into the computer and can be easily produced with little set-up or human intervention.

BRIEF DESCRIPTION OF THE DRAWINGS

FIG. 10 is a schematic, perspective view of the powder dispensing device of the present invention;

DESCRIPTION OF THE PREFERRED EMBODIMENTS

Figure 1:
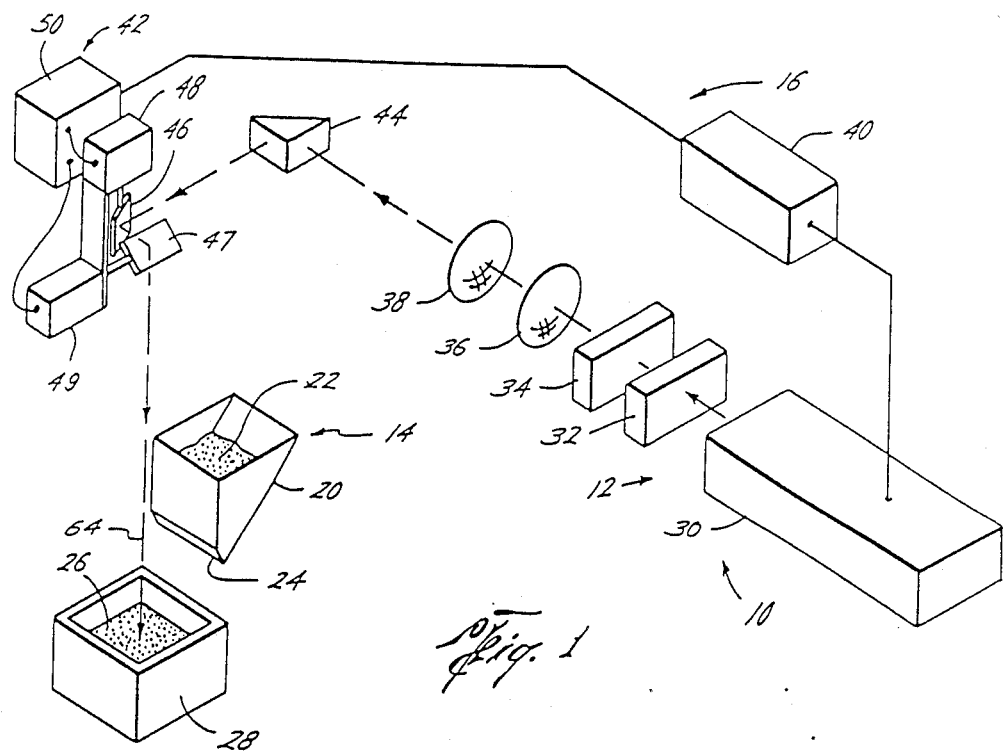
FIG. 1 is a schematic representation of the apparatus of the present invention.

Turning now to the drawings, FIG. 1 broadly illustrates the apparatus 10 in accordance with the present invention. Broadly speaking, the apparatus 10 includes a laser 12, powder dispenser 14, and laser control means 16. In more detail, the powder dispenser 14 includes a hopper 20 for receiving the powder 22 and having an outlet 24. The outlet 24 is oriented for dispensing the powder to a target area 26, which in FIG. 1 is generally defined by the confinement structure 28. Of course, many alternatives exist for dispensing the powder 22.

The components of the laser 12 are shown somewhat schematically in FIG. 1 and include a laser head 30, a safety shutter 32, and a front mirror assembly 34. The type of laser used is dependent upon many factors, and in particular upon the type of powder 22 that is to be sintered. In the embodiment of FIG. 1, a Nd:YAG laser (Lasermetrics 9500Q) was used which can operate in a continuous or pulsed mode with a hundred-watt maximum outlet power in the continuous mode. The laser beam output of the laser 12 has a wavelength of approximately 1060 nm, which is near infrared. The laser 12 illustrated in FIG. 1 includes an internal pulse rate generator with a selectable range of about one kiloHertz to forty kiloHertz, and an approximately six nanosecond pulse duration. In either the pulsed or continuous mode, the laser 12 can be modulated on or off to selectively produce a laser beam which travels generally along the path shown by the arrows in FIG. 1.

To focus the laser beam, a diverging lens 36 and converging lens 38 are disposed along the path of travel of the laser beam as shown in FIG. 1. Using just the converging lens 38, the location of the true focal point is not easily controlled by varying the distance between the converging lens 38 and the laser 12. The diverging lens 36 placed between the laser 12 and converging lens 38 creates a virtual focal point between the diverging lens 36 and the laser 12. Varying the distance between the converging lens 38 and the virtual vocal point, allows control of the true focal point along the laser beam path of travel on the side of the converging lens 38 remote from the laser 12. In recent years there have been many advances in the field of optics, and it is recognized that many alternatives are available to efficiently focus the laser beam at a known location.

In more detail, the laser control means 16 includes computer 40 and scanning system 42. In a preferred embodiment, the computer 40 includes a microprocessor for controlling the laser 12 and a CAD/CAM system for generating the data. In the embodiment illustrated in FIG. 1, a personal computer is used (Commodore 64) whose primary attributes include an accessible interface port and a flag line which generates a nonmaskable interrupt.

As shown in FIG. 1, the scanning system 42 includes a prism 44 for redirecting the path of travel of the laser beam. Of course, physical layout of the apparatus 10 is the primary consideration in determining whether a prism 44, or a plurality of prisms 44, are needed to manipulate the path of travel of the laser beam. The scanning system 42 also includes a pair of mirrors 46, 47 driven by respective galvonometers 48, 49. The galvonometers 48, 49 coupled to their respective mirrors 46, 47 to selectively orientate the mirrors 46, 47. The galvonometers 46, 47 are mounted perpendicular to each other such that the mirrors 46, 47 are mounted nominally at a right angle to each other. A function generator driver 50 controls the movement of the galvonometer 48 (galvonometer 49 is slaved to the movement of galvonometer 48) so that the aim of the laser beam (represented by the arrows in FIG. 1) can be controlled in the target area 26. The driver 50 is operatively coupled to the computer 40 as shown in FIG. 1. It will be appreciated that alternative scanning methods are available for use as the scanning system 42, including acustooptic scanners, rotating polygon mirrors, and resonant mirror scanners.

Figure 2:
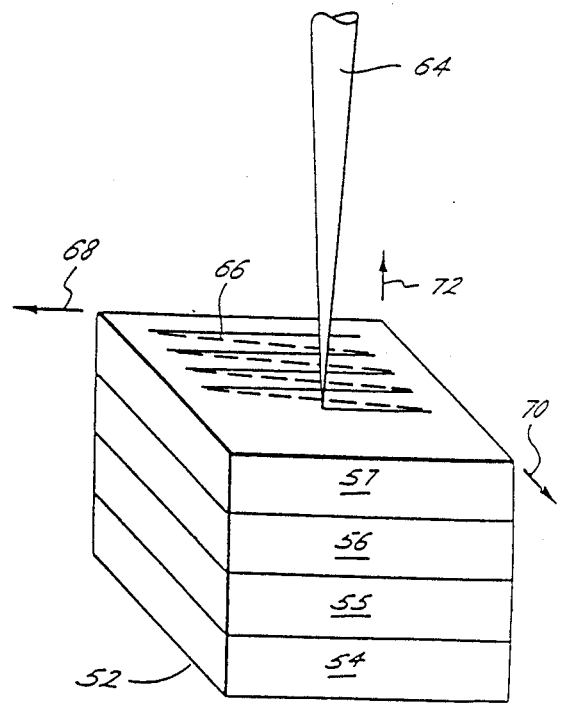
FIG. 2 is a schematic showing a portion of the layered build up of a part produced in accordance with the present invention, and illustrating the raster scan pattern of the laser beam in the target area.

Turning to FIG. 2 of the drawing, a portion of a part 52 is schematically illustrated and shows four layers 54–57. The aim of the laser beam, labeled 64 in FIG. 2, is directed in a raster scan pattern as at 66. As used herein, "aim" is used as a neutral term indicating direction, but does not imply the modulation state of the laser 12. For convenience, the axis 68 is considered the fast scan axis, while the axis 70 is referred to as the slow scan axis. Axis 72 is the direction of part build-up.

Figure 9:
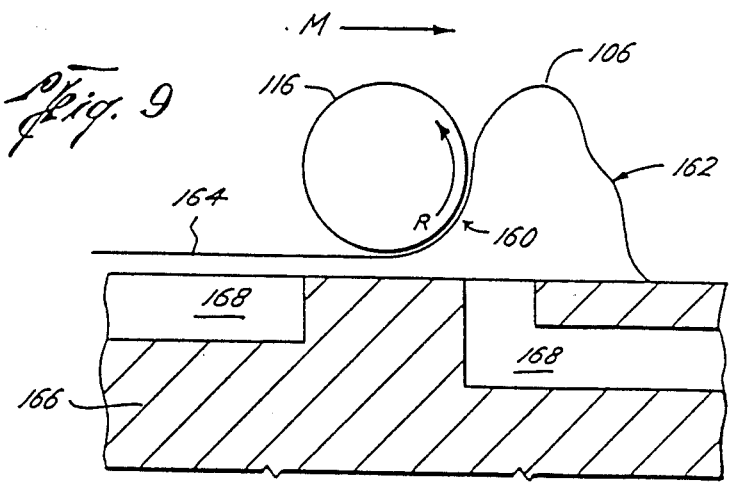
FIG. 9 is a schematic, vertical, sectional view of the powder dispensing device of the present invention distributing powder in a layer on the part being produced.

Turning to FIGS. 9 and 10, an alternative form of powder dispenser 20 is illustrated. Broadly speaking, a support defines a target area 102 which is preferably electrically charged and where the aim of the beam 64 is directed (see FIG. 1). A hopper 104 dispenses the powder 106 through opening 108 into the target area 102. A metering roller (not shown) is disposed in the opening 108, such that when rotated the metering roller deposits a metered mound of powder in a line at end 110 of the target area 102.

A leveling mechanism 114 spreads the mound of powder 106 from end 110 to the other end 112 of the target area. The leveling mechanism 114 includes a cylindrical drum 116 having an electrical charge of opposite polarity to said target area 102. It is believed that the attractive forces between the layer of charge placed on the top layer of the powder 164 and the oppositely charged target area 102 create pressure on the powder layer 164 producing a high bulk density of powder 106 including powder in layer 164. A motor 118 mounted on bar 120 is coupled to the drum 116 via pulley 122 and belt 124 to rotate the drum.

The leveling mechanism 114 also includes a mechanism 126 for moving the drum 116 between end 110 and end 112 of the target area. The mechanism 126 comprises an X/Y table for moving the bar 120 horizontally and vertically. That is, table 128 is fixed while plate 130 is selectively moveable relative to table 128.

Bulk density refers to the mass per unit volume of a material. A first material has a higher bulk density than a second material when the first material has a greater mass per unit volume than the second material.

In the preferred embodiments of the present invention, the high bulk density of the deposited powder is preferably attained through the application of force on the deposited powder during sintering.

High bulk density in a powder may be obtained by simply applying a mechanical press to the powder during sintering where the press is preferably both transparent to the laser beam and has high thermal conductivity.

Figure 11:
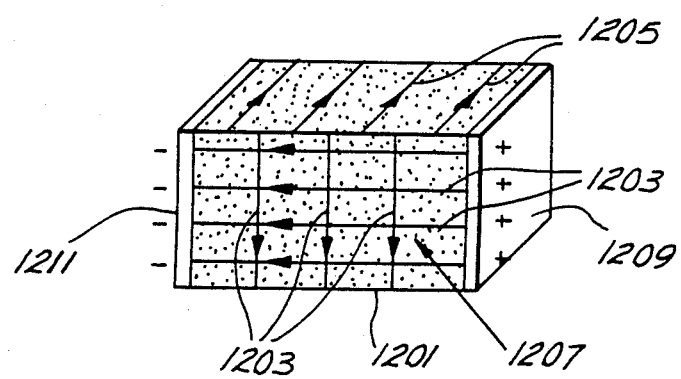
FIG. 11 illustrates electric and magnetic fields interacting with a powder in accordance with the present invention.

FIG. 11 illustrates a preferred embodiment for attaining high bulk density in powder 1207 deposited on support plate 1201 in the target area. Powder 1207 is preferably electrically conductive. Positively charged plate 1209 and negatively charged plate 1211 are preferably positioned substantially perpendicular to support plate 1201 and in parallel and spaced relation to each other. Powder 1207 is positioned between plates 1209 and 1211 on support plate 1201. An electric field 1203 is generated between positively charged plate 1209 and negatively charged plate 1211 through powder 1207. Magnetic field 1205 is also generated. The current flow due to field 1203 in combination with field 1205 creates a downward pressure 1213 on powder 1207 enabling powder 1207 to attain a high bulk density. Fields 1203 and 1205 may be maintained during sintering thus attaining a force on powder 1207 and attaining powder 1207 in high bulk density during sintering.

Figure 12:
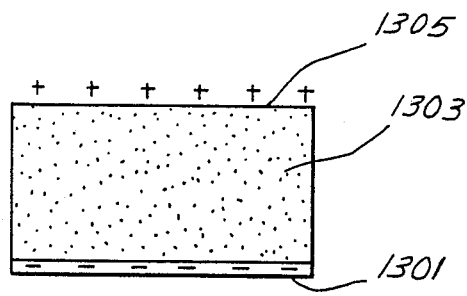
FIG. 12 illustrates a charged support plate and an oppositely charged layer of powder in accordance with the present invention.

FIG. 12 illustrates powder 1303, which is preferably insulative, positioned on charged support plate 1301. A charged layer of powder 1305 is preferably positioned as the top layer of powder 1303 and is preferably charged opposite that of the charge on support plate 1301. In a preferred embodiment, a charged counter-rotating drum (as shown in FIG. 9) may be used to charge layer 1305. Attraction between the opposite charges in support plate 1301 and layer of powder 1305 attain high bulk density in powder 1303.

Figure 14:
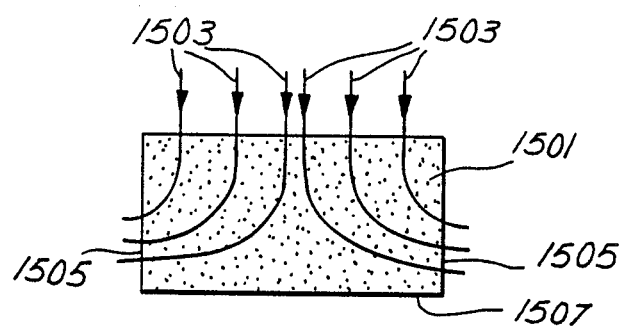
FIGS. 13 and 14 illustrate pressurized fluid interacting with deposited powder of the present invention.
Figure 13:
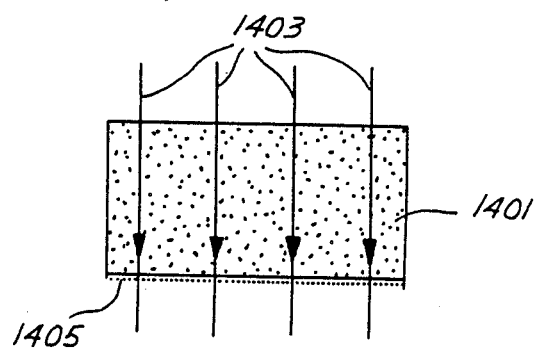

Turning now to FIGS. 13 and 14, two preferred embodiments utilizing a pressurized fluid stream are illustrated. In FIG. 13, powder 1401 is positioned on mesh restraint 1405 which also serves as a support plate for the dispensed powder in the target area. Fluid stream 1403 is applied from above mesh restraint 1405 as shown in FIG. 13 enabling powder 1401 to attain a high bulk density. Mesh restraint 1405 preferably comprises material enabling fluid stream 1403 to pass but restraining powder 1401. FIG. 14 illustrates another preferred embodiment utilizing a fluid stream to attain a high bulk density in a powder. In FIG. 14, powder 1501 is positioned on support plate 1507 and a pressurized fluid stream 1503 is applied from above support plate 1507 and powder 1501 as shown in FIG. 14. Mesh restraints 1505 are positioned substantially perpendicular to support plate 1507 in spaced relation with powder 1501 deposited between mesh restraints 1505. The embodiment shown in FIG. 14 enables a reduction in the buildup of excessive pressure on powder 1501 proximate support plate 1507 by allowing fluid stream 1503 to exit powder 1501 through mesh restraints 1505.

Figure 15:
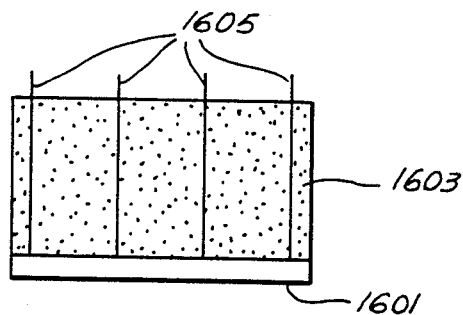
FIG. 15 illustrates a magnetic field interacting with deposited powder of the present invention.

Turning now to FIG. 15, magnetic powder 1603, which is preferably either magnetizable or hard ferromagnetic material, is positioned on support plate 1601. Magnetic field 1605 is preferably applied causing powder 1603 to form or attain a high bulk density.

Figure 16:
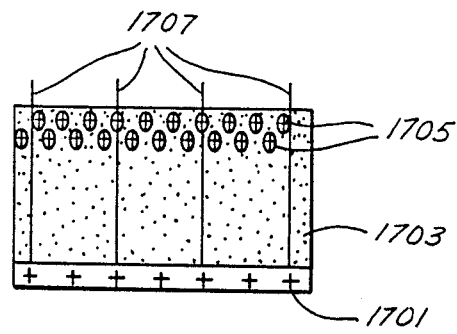
FIG. 16 illustrates an electric field interacting with a powder of the present invention.

Turning now to FIG. 16, powder 1703 comprises polarizable elements 1705. For clarity, polarizable elements 1705 are only illustrated in distal relation to support plate 1701. However, elements 1705 may appear throughout powder 1703. Electric field 1707 is preferably generated through a charge appearing at support plate 1701. Field 1707 generates a downward force on elements 1705 producing a high bulk density in powder 1703.

FIGS. 11 through 16 illustrate preferred embodiments wherein a plurality of layers of sintered powder located proximal a support plate with a single layer of unsintered powder located distal the support plate. External force is, therefore, only required to attain high bulk density in the upper layer.

Operation

A fundamental concept of the present invention is the build up of a part in a layer-by-layer manner. That is, a part is considered a plurality of discrete cross-sectional regions which cumulatively comprise the three-dimensional configuration of the part. Each discrete cross-sectional region has defined two-dimensional boundaries—of course, each region may have unique boundaries.

In the method, a first portion of powder 22 is deposited in the target area 26 and selectively sintered by the laser beam 64 to produce a first sintered layer 54 (FIG. 2). The first sintered layer 54 corresponds to a first cross-sectional region of the desired part. The laser beam selectively sinters only the deposited powder 22 within the confines of the defined boundaries.

There are, of course, alternative methods of selectively sintering the powder 22. One method is for the aim of the beam to be directed in a "vector" fashion—that is, the beam would actually trace the outline and interior of each cross-sectional region of the desired part. Alternatively, the aim of the beam 64 is scanned in a repetitive pattern and the laser 12 modulated. In FIG. 2, a raster scan pattern 66 is used and is advantageous over the vector mode primarily in its simplicity of implementation. Another possibility is to combine the vector and raster scan methods so that the desired boundaries of the layer are traced in a vector mode and the interior irradiated in a raster scan mode. There are, of course, trade-offs associated with the method chosen. For example, the raster mode has a disadvantage when compared to the vector mode in that arcs and lines which are not parallel to the axes 68, 70 of the raster pattern 66 of the laser beam 64 are only approximated. Thus, in some cases resolution of the part can be degraded when produced in the raster pattern mode. However, the raster mode is advantageous over the vector mode in the simplicity of implementation.

Turning to FIG. 1, the aim of the laser beam 64 is scanned in the target area 26 in a continuous raster pattern. Broadly speaking, the driver 50 controls galvonometers 48, 49 to made the raster pattern 66 (see FIGURE 2). Shifting movement of the mirror 46 controls movement of the aim of the laser beam 64 in the fast scan axis 68 (FIG. 2), while movement of the mirror 47 controls movement of the aim of the laser beam 64 in the slow scan access 70.

Figure 3:
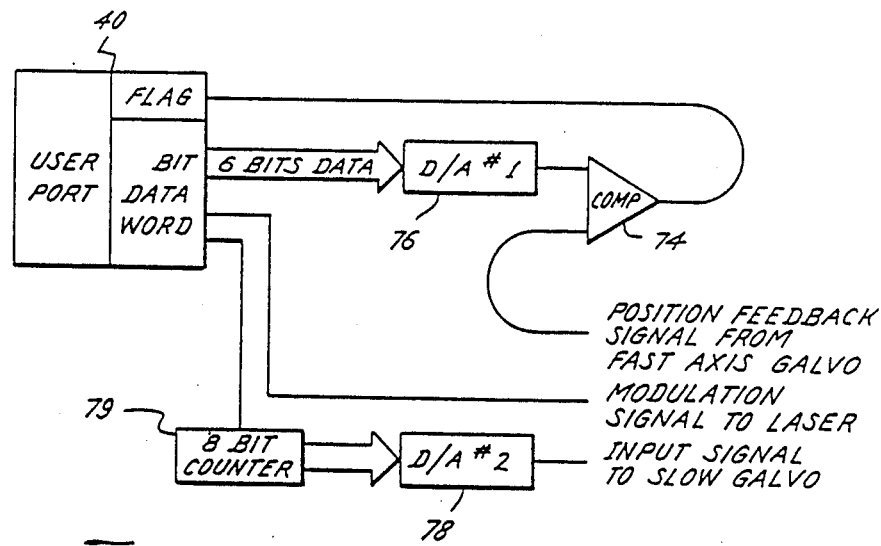
FIG. 3 is a block diagram depicting the interface hardware between the computer, laser and galvonometers of the present invention.

The present position of the aim of the beam 64 is fed back through the driver 50 to the computer 40 (see FIG. 3). As described below, in more detail, the computer 40 possesses information relating to the desired cross-sectional region of the part then being produced. That is, a portion of loose powder 22 is dispensed into the target area 26 and the aim of the laser beam 64 moved in its continuous raster pattern. The computer 40 modulates the laser 12 to selectively produce a laser beam at desired intervals in the raster pattern 66. In this fashion, the directed beam of the laser 12 selectively sinters the powder 22 in the target area 26 to produce the desired sintered layer with the defined boundaries of the desired cross-sectional region. This process is repeated layer-by-layer with the individual layers sintered together to produce a cohesive part—e.g. part 52 of FIG. 2.

Turning now to FIGS. 9 and 10, the dispensing mechanism 114 has been found to provide a controlled level layer of powder in the target area 102 without disturbing the part being produced. A metered amount of powder 106 is deposited at end 110 of the target area 102. The electrically charged drum 116 is spaced away from end 110 when the powder 106 is dispensed. In the system illustrated in FIG. 10, the plate 130 and bar 120 (and attached mechanisms) are raised vertically after the powder is dispensed in the mound. Travel of the plate 130 towards the hopper 104 brings the drum 116 into position adjacent the mound of powder lined up along end 110. The drum 116 is lowered to contact the mound of powder and brought horizontally across the target area 102 to spread the mound of powder in a smooth even layer. Of course, the precise location of plate 130 relative to table 128 can be controlled, so that the spacing between drum 116 and target area 102 can be precisely controlled to yield the desired thickness to the layer of powder. Preferably, the spacing between the drum 116 and target area 102 is constant to give a parallel motion, but other spacing options are available.

As the drum 116 is moved horizontally across the target area 102 from end 110 to end 112, motor 118 is activated to counter-rotate the drum 116. As shown in FIG. 9, "counter-rotation" means the drum 116 is rotated in the direction R counter to the direction of movement M of the drum 116 horizontally across the target area 102.

In more detail (FIG. 9), the drum 116 is counterrotated at high speed to contact the mound of powder 106 along the trailing edge 160. The mechanical action of the drum on the powder ejects the powder to the direction of movement M so that the ejected particles fall in the region of the leading edge of the powder 162. As illustrated in FIG. 9, a smooth, level layer of powder is left behind the drum 116 (between drum 116 and end 110) as depicted at 164.

FIG. 9 also illustrates schematically that the powder 106 can be distributed over the target area without disturbing previously sintered powder 166 or unsintered powder 168. That is, the drum 116 is moved across the target area 102 without transmitting shear stress to the previously built up layers and without disturbing the article as it is being produced. The absence of such sheer stress permits a smooth layer of powder 106 to be distributed on the fragile substrate in the target area, which includes both the sintered particles 166 and the unsintered particles 168.

As shown in FIGS. 11 through 16, pressure, either in the form of fluid streams or electromagnetic fields, may be applied both to layers of sintered powder and, preferably, to a top layer of deposited, unsintered powder to produce and attain high bulk density of the deposited powder during sintering.

Interface and Software

The interface hardware operatively interconnects the computer 40 with the laser 12 and galvonometers 47, 48. The output port of the computer 40 (see FIGS. 1 and 3) is directly connected to the laser 12 to selectively modulate the laser 12. When operated in the pulsed mode, the laser 12 is easily controlled by digital inputs to the pulsed gate input of the laser. Galvonometer 48 is driven by the function generator driver 50 to drive the beam in the fast scan axis 68 independent of any control signals from the computer 40. However, a position feedback signal from the galvonometer 48 is fed to a voltage comparator 74 as shown in FIG. 3. The other input to the comparator is connected to the digital-to-analog convertor 76 which is indicative of the least significant six bits (bits 0-5) of the user port of the computer 40. As shown in FIGURE 3, the output of the voltage comparator 74 is connected to the flag line on the user port of the computer 40. When the voltage comparator determines that the feedback signal from the galvonometer 48 crosses the signal from the digital-to-analog convertor 76, the flag line goes low causing a nonmaskable interrupt. As discussed below, the nonmaskable interrupt causes the next byte of data to put out on the user port of a computer 40.

Finally, as shown in FIG. 3, the galvonometer 49 driving the aim of the laser beam 64 in the slow scan axis 70, is controlled by a second digital to analog convertor 78. The digital-to-analog convertor 78 is driven by a counter 79 which increments with each sweep of the aim of the beam 64 in the fast scan axis 68. The eight byte counter is designed to overflow after 256 scans in the fast scan axis 68 to start a new cycle or raster scan pattern 66.

Preferably, the control information (i.e. defined boundaries of the cross-sectional regions) data for each raster pattern 66 would be determined by a CAD system given the overall dimensions and configuration of the part to be produced. Whether programmed or derived, the control information data for each raster pattern 66 is stored in the computer memory as a series of eight bit words. The data format represents a pattern of "on" and "off" regions of the laser 12, versus distance along the raster pattern 66 traveled by the aim of the beam 64. The data is stored in a "toggle-point" format where the data represents the distance along each raster scan pattern 66 where the laser is modulated (i.e. turned from on to off or from off to on). Although a "bit map" format might be used, the toggle point format has been found more efficient for the production of high resolution parts.

For each eight bit word, the least significant six bits (bits 0-5) represent the location of the next toggle point—i.e. the next location for modulation of the laser 12. The next bit (bit 6) represents whether the laser is on or off immediately before the toggle point identified in the least significant six bits. The most significant bit (MSB or bit 7) is used for looping and for controlling the slow scan axis 70 of the aim of the beam 64. Because the Commodore 64 had limited memory, looping was required—it being understood that a computer 40 with more memory would not require looping.

Figure 6:
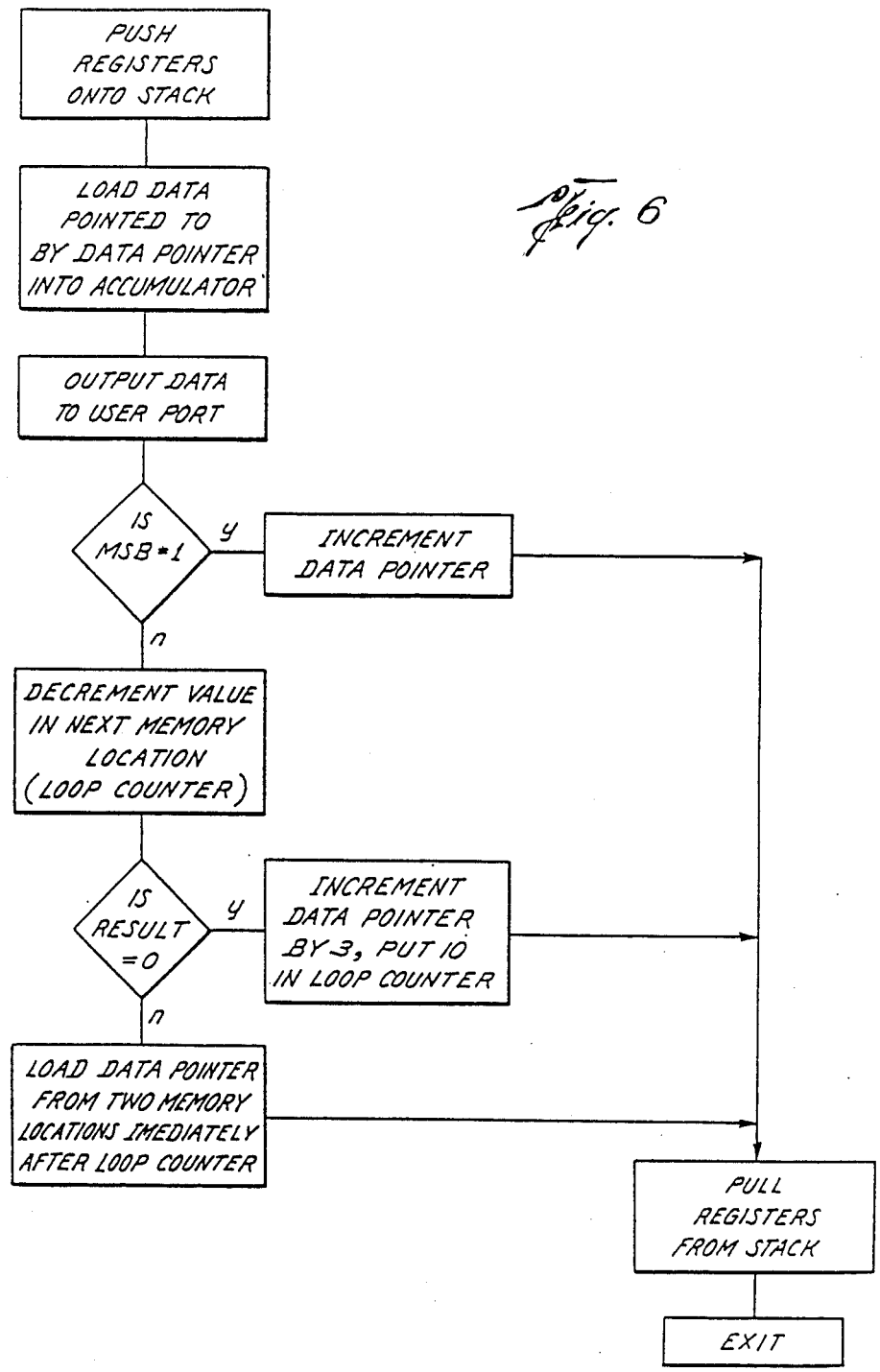
FIG. 6 is a flow chart of the data metering program in accordance with the present invention.

FIG. 6 represents the flow chart for the data metering program. The data metering program is run whenever the flagline goes low causing a non-maskable interrupt (see FIG. 3). The interrupt causes the microprocessor of the computer 40 to retrieve a two byte interrupt vector which points to the location in memory where program control is transferred at interrupt. As shown in FIG. 6, the data metering program first pushes the registers onto the stack and then loads the next byte of data into the accumulator. The data word is also output to the user port with the sixth bit used to modulate the laser 12 (FIG. 3).

As shown in FIG. 6, the most significant bit (MSB or bit 7) of the data word in the accumulator is examined. If the value of the most significant bit is one, that means the end of the loop has not been reached; therefore the data pointer is incremented, registers are restored from the stack, and the data metering program is exited, returning control to the microprocessor at the location of interrupt. If the most significant bit in the accumulator is zero, the data word is the last word in the loop. If the data word is the last word in the loop, the next bit in memory is a loop counter and the following two bytes are a vector pointing to the top of the loop. As can be seen from FIG. 6, if the most significant bit equals zero (end of the loop) the loop counter (next bit) is decremented and analyzed. If the loop counter is still greater than zero, the data pointer assumes the value from the next two memory bytes after the loop counter, registers are pulled from the stack and program control returns to the location of interrupt. On the other hand, if loop counter is zero, the data pointer is incremented by three and the loop counter is reset to ten before exiting the program. It can be appreciated that the need for such looping is absolved if the memory size of the computer 40 is adequate.

EXAMPLE

Figure 4:
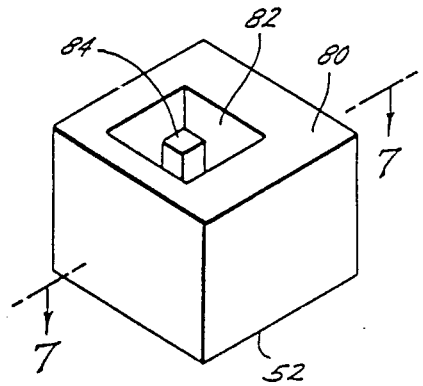
FIG. 4 is a perspective view of an example part produced in accordance with the present invention.
Figure 5:
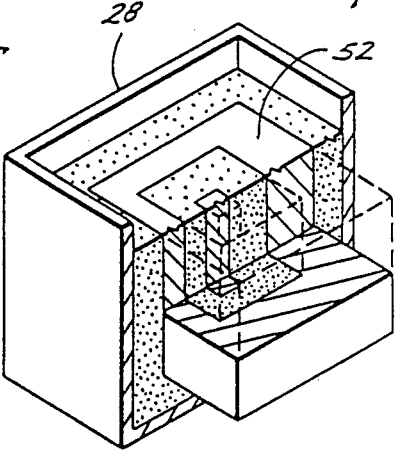
FIG. 5 is a sectional view with parts broken away and in phantom, of the part illustrated in FIG. 4.

In FIGS. 4 and 5, an example part 52 is illustrated. As can be seen from the drawing, the example part 52 assumes an unusual shape in that it is not symmetrical and would be difficult to fabricate using conventional machining methods. For reference purposes, the part 52 includes an outer base structure 80 having an interior cavity 82 and a pillar 84 disposed within the cavity 82 (see FIG. 4). FIG. 5 shows the part 52 within the confinement structure 28 defining the target area 26 illustrated in FIG. 1. As shown in FIG. 5, some of the powder 22 is loose, while the remainder of the powder is selectively sintered to comprise the structure of the part 52. FIG. 5 is shown in vertical section with parts broken away and outlined in phantom to show the sintered cohesive portions of the part 52.

Figure 7:
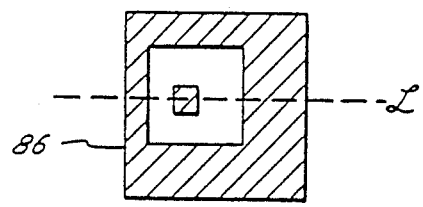
FIG. 7 is a sectional view taken along line 7-7 of FIG. 4.

FIG. 7 shows a horizontal cross-sectional region, taken along line 7—7 of FIG. 4. FIG. 7 represents a discrete layer 86 associated with the cross-sectional region of the part being produced. As such, the sintered layer 86 of FIG. 7 is a product of a single raster pattern 66 as illustrated in FIG. 2.

Figure 8:
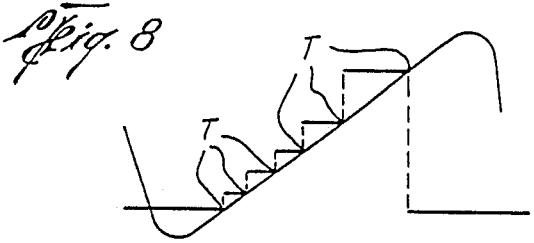
FIG. 8 illustrates in diagram form the correlation between a single sweep of the laser across the layer of FIG. 7 and the control signals of the present invention.

For reference purposes, a sweep line through the sintered layer 86 has been labeled "L." FIG. 8 illustrates the software and hardware interface operation during the sweep L. The top graph shows the position of feedback signal from the fast axis galvo 48 and the output signal of the first digital to analog convertor 76 (compare FIG. 3). The voltage comparator 74 generates an output signal to the flag line of the computer 40 every time the feedback signal and first D/A output signal cross.

In the top graph of FIG. 8, these points are labeled T to represent toggle points. As can be seen from the bottom graph of FIG. 8, the flag line generates a non-maskable interrupt corresponding to each toggle point T. The sixth bit of each data word is analyzed and the current state of the laser 12 will reflect the value. The penultimate graph of FIG. 8 shows the laser modulation signal for the sweep line L of FIG. 7. The second graph of FIG. 8 shows that a high-going edge in the most significant bit will be encountered at the end of each sweep of the aim of the laser beam 64 in the fast scan axis 68. As shown in FIGS. 3 and 6, the counter 79 increments on a high going edge, and outputs a signal to the second digital-analog convertor 78 to drive the slow axis galvonometer 49.

As can be seen from the example illustrated in the drawing, parts of complex shape can be produced with relative ease. Those skilled in the art will appreciate that the part 52 illustrated in FIG. 4 would be difficult to produce using conventional machining methods. In particular, machine tool access would make the fabrication of cavity 82 and pillar 84 difficult, if not impossible, to produce if the part 52 were of a relatively small size.

In addition to avoiding the access problem, it will be appreciated that the production accuracy is not dependent upon machine tool wear and the accuracy of mechanical components found in conventional machine tools. That is, the accuracy and tolerances of the parts produced by the method and apparatus of the present invention are primarily a function of the quality of the electronics, the optics, and the implementing software. Of course, heat transfer and material considerations do affect the tolerances obtainable.

Those skilled in the art will appreciate that conventional machining techniques require considerable human intervention and judgment. For example, a conventional machining process, such as milling, would require creativity to make such decisions as tool selection, part segmenting, sequence of cuts, etc. Such decisions would even be more important when producing a control tape for a tape control milling machine. On the other hand, the apparatus of the present invention only requires the data relating to each cross-sectional region of the part being produced. While such data can be simply programmed into the computer 40, preferably, the computer 40 includes a CAD/CAM system. That is, the CAD/CAM portion of the computer 40 is given the overall dimensions and configurations of the desired part to be produced and the computer 40 determines the boundaries for each discrete cross-sectional region of the part. Thus, a vast inventory of part information can be stored and fed to the computer 40 on a selectable basis. The apparatus 10 produces a selected part without set-up time, part specific tooling, or human intervention. Even the complex and expensive dies associated with powder metallargy and conventional casting techniques are avoided.

While large quantity production runs and certain part material characteristics might be most advantageously made using conventional fabrication techniques, the method and apparatus 10 of the present invention is useful in many contexts. In particular, prototype models and casting patterns are easily and inexpensively produced. For example, casting patterns are easily made for use in sand casting, lost wax casting, or other forming techniques. Further, where desired quantities are very small, such as with obsolete replacement parts, production of such replacement parts using the apparatus 10 of the present invention has many advantages. The use of the apparatus 10 may be useful where size of production facilities is a major constraint, such as on-ship or in outerspace. Similarly, use of the methods and apparatus shown in FIGS. 12 through 17 may also be useful for production where the size of facilities or lack of gravity is a major constraint.

Further modifications and alternative embodiments of the apparatus of this invention will be apparent to those skilled in the art in view of this description. Accordingly this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, elements or materials may be substituted for those illustrated and described herein, parts may be reversed, and certain features of the invention may be utilized independently of the use of other features, all as would be apparent to one skilled in the art after having the benefit of this description of the invention.

We claim:

1. An apparatus for producing a part comprising:
   beam means for selectively emitting a directed energy beam;
   structure for providing a target area for producing the part;
   means for depositing a powder into said target area;
   control means for moving the aim of the beam and for modulating the beam means to selectively sinter within defined boundaries a layer of powder deposited in said target area,
      the control means being operable to effect selective sintering of sequential layers of powder within respective defined boundaries to produce a part comprising a plurality of layers sintered together; and
   means for attaining a high bulk density in said powder in said target area.

2. The apparatus of claim 1 wherein said means for attaining a high bulk density enables attaining a high bulk density during sintering.

3. The apparatus of claim 1 wherein said depositing means comprises apparatus to electrostatically charge and dispense said powder.

4. The apparatus of claim 3 wherein said means for attaining comprises means for producing an electromagnetic field proximate said target area, said electromagnetic field inducing high bulk density in said powder in said target area during sintering.

5. The apparatus of claim 4 wherein said means for producing an electromagnetic field enables production of a field having varying field strengths across said target area.

6. The apparatus of claim 1 wherein said powder comprises polarizable elements and said depositing means comprise apparatus to dispense said powder.

7. The apparatus of claim 6 wherein said means for attaining comprises means for producing an electromagnetic field proximate said target area, said electromagnetic field inducing high bulk density in said powder in said target area during sintering.

8. The apparatus of claim 7 wherein said means for producing an electromagnetic field enables production of a field having varying field strengths across said target area.

9. The apparatus of claim 1 wherein said depositing means comprises an apparatus to dispense said powder with a first electrical charge and said target area having a second electrical charge, said first electrical charge being of opposite charge to said second electrical charge.

10. The apparatus of claim 1 wherein said depositing means comprises:
    apparatus to dispense a first portion of said powder with a first electrical charge on said first portion; and
    a contouring means passable proximal said dispensed first portion.

11. The apparatus of claim 10 wherein said depositing means further comprises apparatus to dispense a second portion of said powder with a second electrical charge on said second portion, said first electrical charge being of opposite charge to said second electrical charge.

12. The apparatus of claim 1 wherein said depositing means further comprises a device for distributing a mound of powder at one end of a region as a layer of powder in the region, comprising: electrically charged drum means;
    means for moving the drum from said one end of the region to another end of the region with a desired spacing between said region and drum;
    means for rotating the drum counter to the direction of movement of the drum from said one end to said other end,
    said drum means being operable when counter-rotated and moved from said one end to said other end to contact said mound and eject powder in said direction of movement to leave a layer of powder between the drum means and said one end having a thickness of approximately said desired spacing.

13. The apparatus of claim 1 wherein said powder is magnetic and said means for attaining comprises means for producing an electromagnetic field proximate said target area, said electromagnetic field inducing high bulk density in said powder in said target area during sintering.

14. The apparatus of claim 1 wherein said powder is polarizable and said means for attaining comprises means for producing an electromagnetic field, said electromagnetic field inducing high bulk density in said powder in said target area during sintering.

15. The apparatus of claim 1 wherein said means for attaining comprises apparatus for directing a fluid stream to said powder deposited in said target area inducing high bulk density in said powder in said target area during sintering.

16. The apparatus of claim 1 wherein said means for attaining comprises apparatus to enable the application of centrifugal force to said deposited powder to induce high bulk density in said powder in said target area.

17. A method of producing a part comprising the steps of:
    depositing a first portion of powder onto a target surface;
    scanning the aim of a directed energy beam over the target surface;

sintering a first layer of the first powder portion corresponding to a first cross-sectional region of the part by operating the beam when the aim of the beam is within boundaries defined by said first cross-sectional region;

depositing a second portion of powder onto the first sintered layer;

scanning the aim of a directed energy beam over the first sintered layer;

sintering a second layer of the second powder portion corresponding to a second cross-sectional region of the part by operating the beam when the aim of the beam is within boundaries defined by said second cross-sectional region, the first and second layers being joined during the sintering of said second layer;

depositing successive portions of powder in high bulk density onto the previous sintered layers and sintering a layer of each successive portion to produce a part comprising a plurality of sintered layers; and attaining high bulk density in each said portion of powder in said target area.

18. The method of claim 17 wherein said step of attaining attains a high bulk density while sintering said deposited powder.

19. The method of claim 17 wherein at least one of said steps of depositing further comprises the substeps of electrostatically charging and dispensing said powder.

20. The method of claim 17 wherein at least one of said steps of depositing further comprises the substep of electrostatically charging and dispensing said powder and said step of attaining comprises producing an electromagnetic field proximate said target surface, said electromagnetic field inducing high bulk density in said deposited powder during sintering.

21. The method of claim 17 wherein at least one of said portions of powder is polarizable.

22. The method of claim 17 wherein at least one of said portions of powder is polarizable and said attaining step comprises producing an electromagnetic field proximate said target surface, said electromagnetic field inducing high bulk density in said deposited powder during sintering.

23. The method of claim 17 wherein at least one of said steps of depositing further comprises the substeps of:
dispensing said powder with a first electrical charge; and
placing a second electrical charge on said target surface, said first electrical charge being of opposite charge to said second electrical charge.

24. The method of claim 17 wherein at least one of said steps of depositing further comprises the substeps of:
placing a first electrical charge on a first subportion of said powder and dispensing said first subportion; and
passing a contouring means proximal said dispensed first subportion.

25. The method of claim 17 wherein at least one of said steps of depositing further comprises the substeps of:
placing a first electrical charge on a first subportion of said powder and dispensing said first subportion;
passing a contouring means proximal said dispensed first subportion; and
placing a second electrical charge on a second subportion of said powder and dispensing said second subportion, said first electrical charge being of opposite charge to said second electrical charge.

26. The method of claim 17 wherein said powder is magnetic and said step of attaining comprises producing an electromagnetic field proximate said target surface, said electromagnetic field inducing high bulk density in said deposited powder during sintering.

27. The method of claim 17 wherein said powder is polarizable and said step of attaining comprises producing an electromagnetic field, said electromagnetic field inducing high bulk density in said deposited powder during sintering.

28. The method of claim 19 wherein said step of attaining comprises the substep of directing a fluid stream to said deposited powder inducing high bulk density in said deposited powder during sintering.

29. The method of claim 17 wherein said step of attaining comprises the substep of applying centrifugal force to said deposited powder inducing high bulk density in said deposited powder.

30. A method of applying a layer of powder in a region comprising the steps of:
depositing a mound of powder proximate one end of said region;
moving an electrically charged drum in a direction from said one end of said region towards another end of the region;
rotating the drum counter to the direction of movement from said one end towards the other end;
contacting the mound of powder with the counter-rotating drum as it moves towards said other end;
ejecting powder from said mound in the direction of movement from contact between said drum and mound, a layer of powder being left behind said moving drum between the drum and said one end.

* * * * *